Dec. 1, 1931.  E. H. GROFF, JR  1,833,967
TOOTHBRUSH
Filed Feb. 10, 1930   3 Sheets-Sheet 2
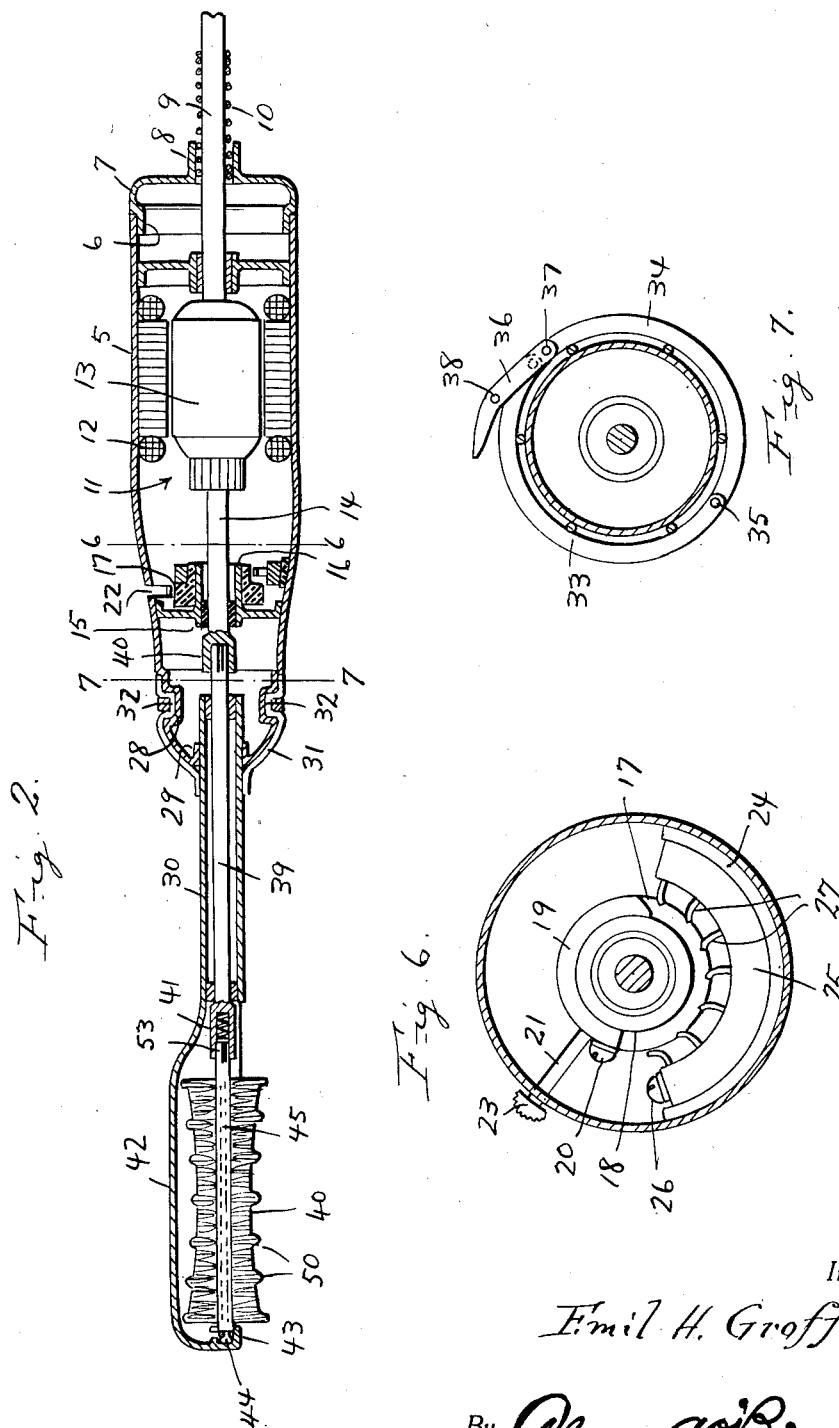
Inventor
*Emil H. Groff Jr.*
By *Clarence A. O'Brien*
Attorney Dec. 1, 1931.  E. H. GROFF, JR  1,833,967
TOOTHBRUSH
Filed Feb. 10, 1930   3 Sheets-Sheet 3
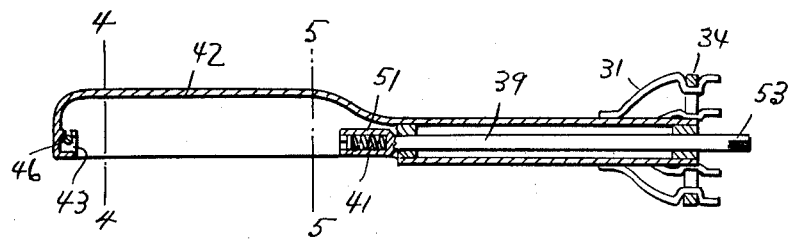
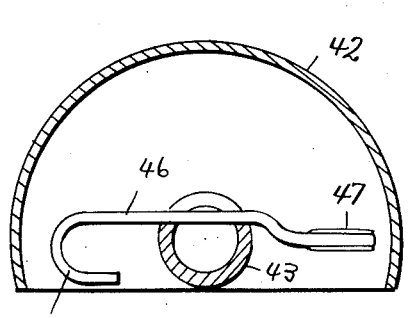
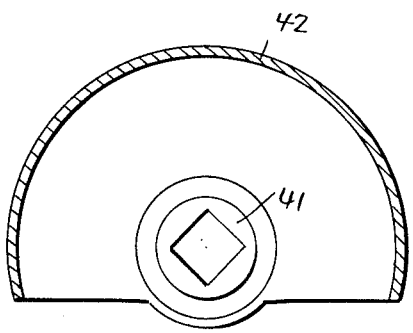
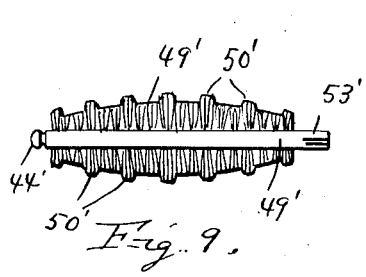
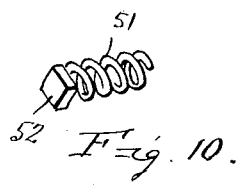
Inventor
Emil H. Groff, Jr.
By Clarence A. O'Brien
Attorney Patented Dec. 1, 1931

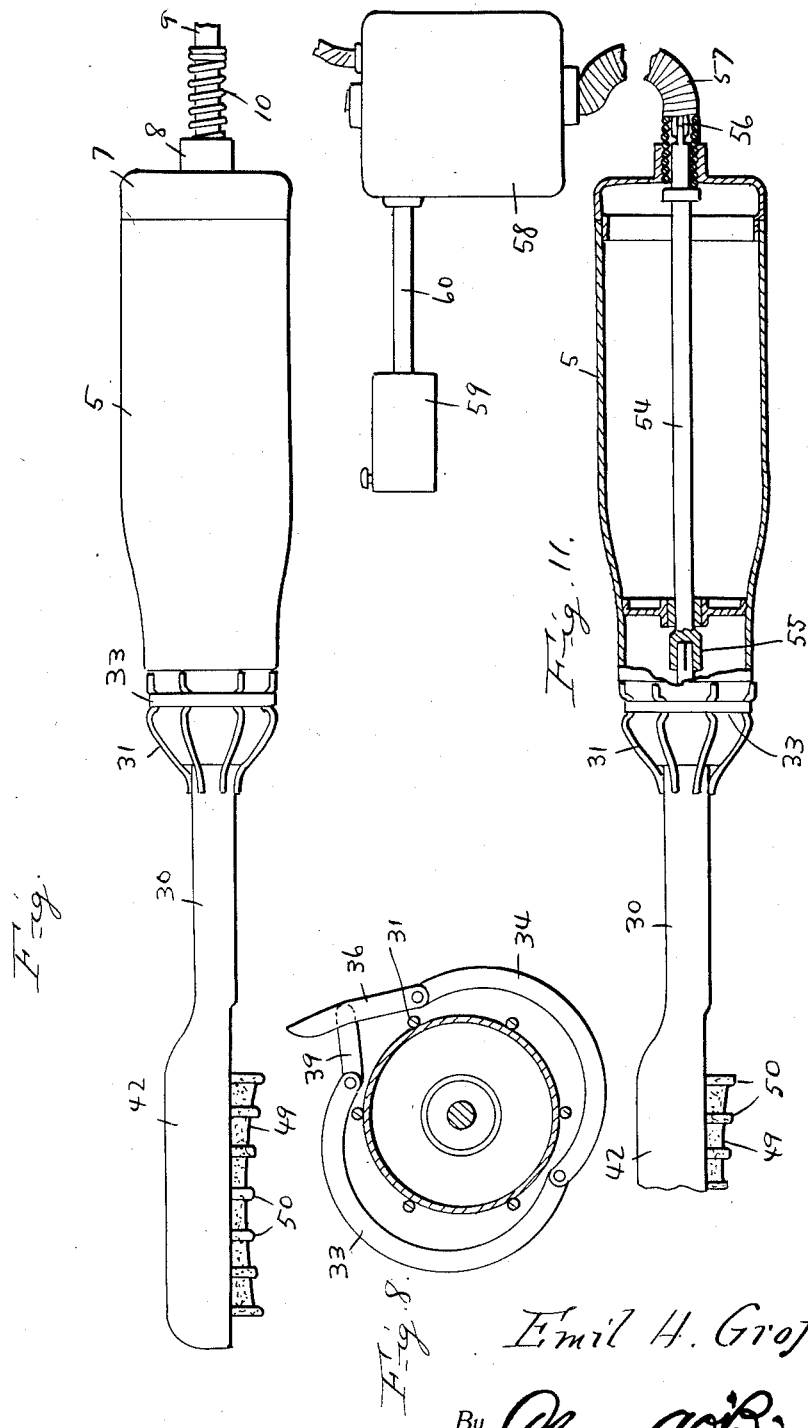

1,833,967

UNITED STATES PATENT OFFICE

EMIL H. GROFF, JR., OF MARINE CITY, MICHIGAN

TOOTHBRUSH

Application filed February 10, 1930. Serial No. 427,299.

The present invention appertains to improvements in tooth brushes, and more particularly to a tooth brush of the rotary power driven type.

An important object of this invention is to provide a rotary tooth brush which will efficiently clean the teeth without causing any injury to the gums.

Another important object of the invention is to provide a rotary tooth brush, the speed of which can be controlled in a convenient manner.

Still another important object of the invention is to provide a motor driven tooth brush which will be easy to handle and which in the event of worn parts, can be quickly disassembled for the purpose of repair or replacement of parts.

These and various other important objects and advantages of the invention will more readily become apparent to the reader as the specification proceeds hereinafter.

In the drawings:—

Figure 1 represents a side elevational view of the preferred form of the tooth brush.

Fig. 2 represents a longitudinal sectional view through the form of the brush shown in Fig. 1.

Fig. 3 is a longitudinal sectional view through the brush hood and shaft housing.

Fig. 4 represents a cross sectional view, taken substantially on the line 4—4 of Fig. 3.

Fig. 5 represents a cross sectional view taken substantially on the line 5—5 of Fig. 3.

Fig. 6 is a cross sectional view taken substantially on the line 6—6 of Fig. 2.

Fig. 7 represents a cross sectional view taken substantially on the line 7—7 of Fig. 2.

Fig. 8 represents a cross sectional view, also taken substantially on the line 7—7 of Fig. 2, but showing the fastener in open position.

Fig. 9 represents a cross sectional view of a modified form of brush.

Fig. 10 is a perspective view of the spring employed in the drive shaft.

Fig. 11 represents a fragmentary longitudinal sectional view through a modified form of power drive.

Referring to the drawings, wherein like numerals designate like parts, it can be seen that the present invention (as disclosed in Figs. 1, 2, 3, 4, 5, 6, 7, 8 and 10), includes a hollow handle structure 5, which is open at its butt end for receiving the skirt portion 6 of a cap 7.

The cap 7 has a collar extension 8 through which the conductor 9 extends, around which a spring 10 is coiled at a point adjacent the cap 7, for the obvious purpose of preventing slipping and wear of the cable at this portion.

The motor 11 is mounted within the handle 5 and includes the usual field 12, and armature 13 operating therein. The armature 13 drives a shaft 14 which is journaled in the bearing 15 adjacent the forward end of the handle.

Bearing 15 has a tubular extension 16 which surrounds the shaft 14, and has an annular body 17 of some suitable di-electric material surrounding the same, loosely, so that the said body can be rotated thereon.

The body 17 is provided with a collar 18 to which an arcuate-shaped contact 19 is secured. A binding post 20 is located on the contact 19 through which one end of a break in the current supply line to the motor is connected.

An arm 21 projects outwardly from the body 17 and through a slot 22 in the handle 5. This arm 21 is equipped with a head 23 at its outer end to facilitate actuation of the said arm.

An insulating strip 24 is secured to the inside of the handle 5 for spacing the arcuate-shaped block 25 of conductive material from the handle 5. This block 25 has a binding post 26 at one end to which the opposite break in the current supply line to the motor may be secured.

The body 25 has a plurality of inwardly extending fingers 27 curved in the general direction of travel of the contact 19. The block 25 is constructed of some suitable resistance material, so that when the contact 19 is impressed across the fingers 27, the desired amount of resistance will be cut out of the circuit, so as to increase the speed of the brush which will be fully described hereinafter.

The forward end of the handle 5 is provided with a circumferentially extending channel 28, while the forward end of the handle is provided with an opening and an inwardly extending sleeve 29 for snugly receiving the shaft housing 30 which is of tubular shape. This housing 30 has a plurality of fingers 31 radiating therefrom and disposed toward the adjacent end thereof.

Each of these fingers adjacent its extremity is provided with an offset 32 for disposition within the aforementioned channel 28 of the handle 5. Thus, the housing 30 is connected to the handle 5 and in order to prevent dislocation of the housing from the handle, a fastener such as is disclosed in Figs. 7 and 8 is supplemented.

This fastener comprises a pair of semi-circular members 3³ and 34, each connected at one of its ends to the other by a rivet or pin 35. A lever 36 is also provided and is pivotally connected to the free end of the section 34 as at 37, while the free end of the section 33 is pivotally connected to the lever 36 as at 38 by a pivot link 39, (see Fig. 8).

Obviously, by moving this lever 36 in one direction, the sections 33 and 34 may be extended to release the fingers 31, and by moving the lever in the opposite direction, the sections are contracted against the fingers 31 so as to urge the offset portion 32 thereof, into the channels 28 so as to insure the retention therein and the positive connection of the housing 30 to the handle 5.

A shaft 39 is journaled through the housing 30 and at one end is squared for disposition within the socket 40 of the armature shaft 14. The opposite end of the shaft 39 projects beyond the housing 30 and is equipped with an elongated socket 41 which is adapted also for receiving a square shaft.

Projecting from the shaft housing 30 is a hood 42 which has an inwardly disposed bearing with a groove therein 43 at its outer end for receiving the head 44 of the brush shaft 45. In Fig. 4, it can be seen that a spring 46 is employed, anchored at one end as at 47 to the outer end of the hood 42 and disposed so as to extend into the top portion of the bearing and fit in the groove in the head 44 to hold it in position, the latter not being shown in Fig. 4.

The free end of the spring 46 is curved as at 48 to provide a hook which may be readily grasped in between the fingers. As is clearly shown in Fig. 2, the bristles 49 are gradually increased in radii from the center towards each end to follow the general curvature of the teeth, and it will also be noted that the bristles of the brush are so cut as to provide ridges 50 at certain spaced intervals, preferably equal in spaced relation to the width of ordinary teeth, so that the ridges may engage between the teeth, to thoroughly clean the surfaces therebetween.

Compressible coiled spring 51, such as is shown in Fig. 10, is installed within the socket 41 and is equipped with a square plate 52 at one end thereof against which the squared end 53 of the shaft 45 may bear. Obviously, when assembling the brush within the hood, the squared end is first inserted within the socket 41, and the spring 51 is compressed to the extent to permit the head 44 to be properly engaged upon the bearing 43, after which the spring 46 is released so as to bear across in the groove in the shaft to prevent dislocation of the shaft 45.

In Fig. 9. a slightly modified form of brush is disclosed and is preferably adapted for cleaning the inside of the teeth. This brush comprises a shaft 49' having the head 44' at one end and the squared portion 53' at its opposite end. The bristles 49' are reduced in radii toward each end from the intermediate portion decreasing the circumference of the brush and at certain spaced intervals ridges 50' are formed to facilitate cleaning between the teeth.

A modification of the invention is disclosed in Fig. 11, and consists in the provision of a shaft 54 journaled through the handle 5. This shaft 54 takes the place of the armature shaft 14 and is provided with the socket 55 corresponding to the socket 40 in Fig. 2. The opposite end of the shaft 54 from the socket 55 is connected to a flexible shaft 56 which is disposed through a flexible covering 57, and connected to the motor 58.

The electrical source of supply to the electrical motor is controlled by means of the switch 59. The other parts of this modification are identical with the preferred form of the invention, and obviously, certain changes in the shape, size and materials, may be resorted to in the construction of this novel device, without departing from the spirit and scope of the invention as claimed hereinafter

Having thus described my invention, what I claim as new is:—

A motor driven tooth brush comprising a hollow handle having its forward end contracted and provided with a supporting sleeve, the handle adjacent to the contracted end thereof being provided with an annular groove, a motor shaft rotatably mounted within the hollow handle, a rotary tooth brush shaft, a tooth brush connected with the brush shaft, a sleeve for the tooth brush shaft slidably fitted within the supporting sleeve carried by the contracted end of the hollow handle, a plurality of resilient fingers carried by the brush shaft sleeve for engaging over the contracted end of the hollow handle and having bight portions for engaging in the annular groove formed in the hollow handle, and means for contracting and holding the bight portion of the resilient fingers in said groove.

In testimony whereof I affix my signature.

EMIL H. GROFF, Jr.